United States Patent
Jensen

(10) Patent No.: US 10,187,949 B2
(45) Date of Patent: Jan. 22, 2019

(54) LIGHT SYSTEM WITH IMPROVED COLOR CONTROL

(71) Applicant: Martin Professional ApS, Aarhus N (DK)

(72) Inventor: Frank Kjaer Jensen, Skødstrup (DK)

(73) Assignee: MARTEN PROFESSIONAL APS, Aarhus (DK)

( * ) Notice: Subject to any disclaimer, the term of this patent is extended or adjusted under 35 U.S.C. 154(b) by 21 days.

(21) Appl. No.: 15/138,708

(22) Filed: Apr. 26, 2016

(65) Prior Publication Data

US 2016/0323961 A1    Nov. 3, 2016

(30) Foreign Application Priority Data

Apr. 29, 2015 (EP) .................................... 15165618

(51) Int. Cl.
*H05B 33/08*     (2006.01)
*F21K 9/62*      (2016.01)
(Continued)

(52) U.S. Cl.
CPC ........... *H05B 33/0857* (2013.01); *F21K 9/62* (2016.08); *H05B 33/086* (2013.01);
(Continued)

(58) Field of Classification Search
CPC .............. F21Y 2115/10; F21Y 2103/10; F21Y 2101/00; F21Y 2113/13; F21Y 2105/10;
(Continued)

(56) References Cited

U.S. PATENT DOCUMENTS 7,255,458 B2 *  8/2007  Ashdown ................ F21V 5/002
                                                  362/231
7,399,108 B2 *  7/2008  Ayabe .................. G02B 6/0001
                                                  257/E33.071
(Continued)

FOREIGN PATENT DOCUMENTS

WO          2008129485 A1    10/2008
WO    WO 2008129485 A1 *    10/2008    ......... H05B 33/0842
(Continued)

OTHER PUBLICATIONS

European Search Report for Application No. 15 16 5618, dated Feb. 2, 2016.

*Primary Examiner* — Tung X Le
*Assistant Examiner* — Borna Alaeddini
(74) *Attorney, Agent, or Firm* — Artegis Law Group, LLP

(57) ABSTRACT

The invention relates to a light system, which comprises a plurality of light source modules arranged in at least a row in a system housing having an outer boundary, and diffuser to which the light from the plurality of light source modules is emitted. Each light source module comprises at least one light source emitting light of a predefined color. Furthermore, the plurality of light source modules comprise at least one first light source module which is located closer to the outer boundary of the system housing than second light source modules of the plurality of light source modules which are located further away from the outer boundary than the at least one first light source module. The system furthermore comprises a color control unit configured to control, for each of the light source modules of the light system, the at least one light source individually using a light source control signal. The color control unit is configured such that, when a desired color is to be generated at the diffuser, it selects a first light source control signal for the at least one light source of the at least one first light source
(Continued)

module that is different from a second light source control signal selected for the at least one light source of the second light source modules.

11 Claims, 3 Drawing Sheets

(51) Int. Cl.
  *F21Y 105/12* (2016.01)
  *F21Y 113/13* (2016.01)
  *F21Y 103/10* (2016.01)
  *F21Y 107/00* (2016.01)
  *F21Y 105/10* (2016.01)
  *F21Y 113/17* (2016.01)
  *F21Y 115/10* (2016.01)

(52) U.S. Cl.
  CPC ....... *F21Y 2103/10* (2016.08); *F21Y 2105/10* (2016.08); *F21Y 2105/12* (2016.08); *F21Y 2107/00* (2016.08); *F21Y 2113/13* (2016.08); *F21Y 2113/17* (2016.08); *F21Y 2115/10* (2016.08); *Y02B 20/341* (2013.01)

(58) Field of Classification Search
  CPC .............. F21Y 2113/00; F21Y 2105/12; F21Y 2105/16; F21Y 2107/00; F21Y 2107/40; F21Y 2113/17
  See application file for complete search history.

(56) References Cited

U.S. PATENT DOCUMENTS

| | | | | |
|---|---|---|---|---|
| 7,859,614 | B2* | 12/2010 | Moon | G02F 1/133603 349/69 |
| 8,287,144 | B2* | 10/2012 | Pedersen | F21S 10/02 362/217.01 |
| 8,742,694 | B2* | 6/2014 | Bora | H05B 33/0863 315/113 |
| 8,920,001 | B2* | 12/2014 | Park | F21V 13/02 362/235 |
| 9,279,547 | B2* | 3/2016 | Lacroix | F21V 7/0025 |
| 9,360,174 | B2* | 6/2016 | Dong | H05B 33/0854 |
| 9,574,717 | B2* | 2/2017 | Scapa | F21V 23/006 |
| 2002/0114155 | A1* | 8/2002 | Katogi | F21S 2/00 362/219 |
| 2013/0063944 | A1* | 3/2013 | Lodhie | F21K 9/278 362/249.02 |
| 2013/0286656 | A1* | 10/2013 | Park | F21V 13/02 362/307 |
| 2014/0268747 | A1* | 9/2014 | Demuynck | F21S 9/022 362/235 |

FOREIGN PATENT DOCUMENTS

| | | | | |
|---|---|---|---|---|
| WO | | 2010122312 A1 | 10/2010 | |
| WO | | 2011163672 A2 | 12/2011 | |
| WO | WO | 2011163672 A2 * | 12/2011 | ......... H05B 33/0818 |
| WO | | 2013021311 A2 | 2/2013 | |

* cited by examiner

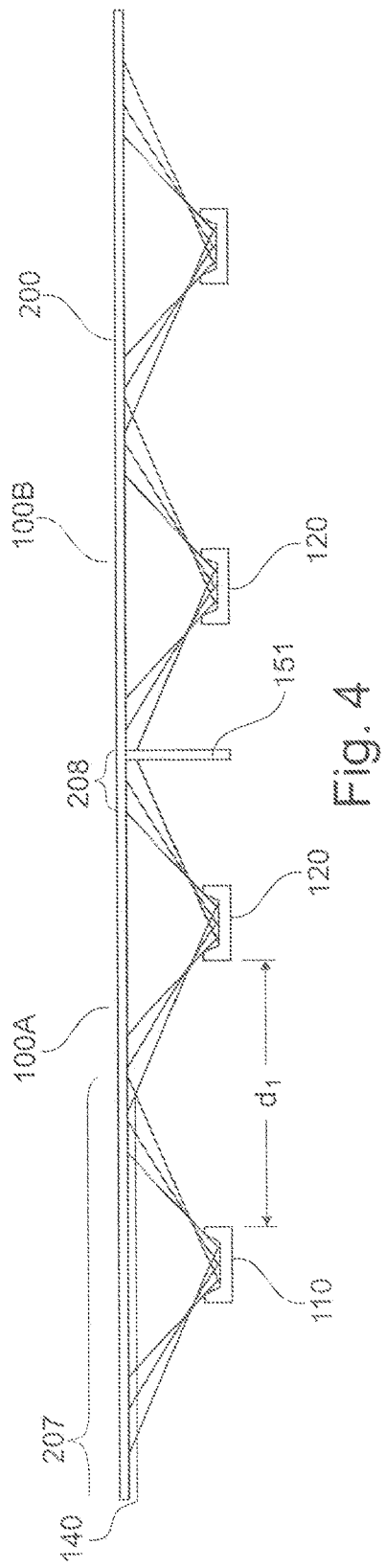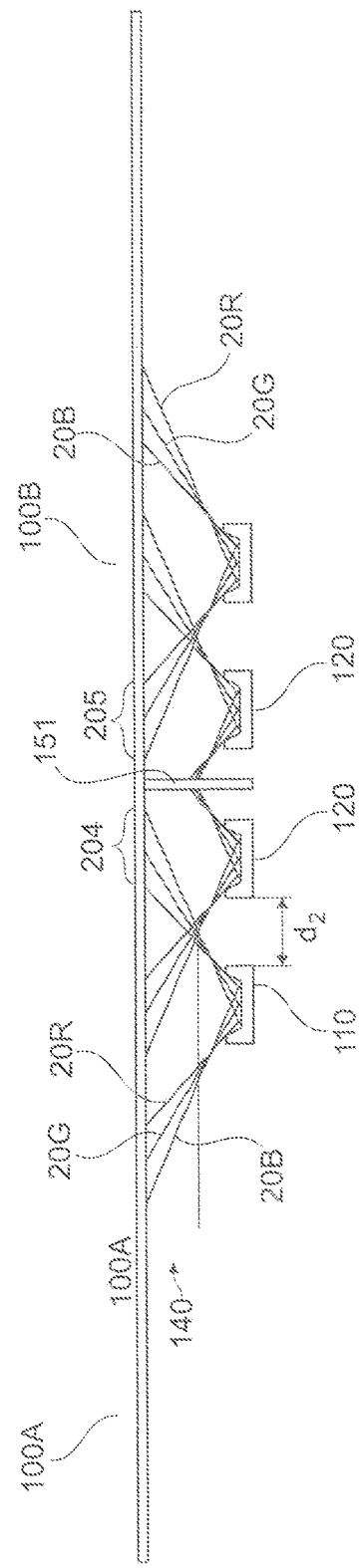

LIGHT SYSTEM WITH IMPROVED COLOR CONTROL

CROSS-REFERENCE TO RELATED APPLICATIONS

This application claims priority to EP patent application titled, "LIGHT SYSTEM WITH IMPROVED COLOR CONTROL," filed on Apr. 29, 2015 and having Application No. EP 15 165 618.8. The subject matter of this related application is hereby incorporated herein by reference.

TECHNICAL FIELD

The present application relates to a light system such as a linear LED strip and relates to a method for controlling the light system.

BACKGROUND

Linear light systems, e.g. linear LED pixel strips, comprise a plurality of light source modules or LED pixels with each of the light source modules comprising several light sources of different colors. A common combination for the different colors of each light source module of such a linear light system comprises a red, a green and a blue LED, thus also named RGB light source module. The LED light sources are often provided as a package where the RGB light sources are arranged in a linear configuration. In addition to a linear configuration, a rectangular configuration of the light source modules, e.g. in an LED video panel, is possible. The light system can be provided with a diffuser above the different LED pixels light source module which serves to blend the light instead of displaying the different light source modules as sharp pixels.

These linear light systems are typically provided in a fixed length. It has been noted that when such light systems are used with a diffuser above the LED pixels that the colors emitted by the light system near the edge or the end of the light system are different to the colors emitted by the light system in the middle of the light system when a uniform color should be emitted by the light system or when a desired color should be emitted. These color variations are especially visible when a plurality of these light systems is arranged side by side.

Accordingly, a need exists to provide a light system which overcomes the above-mentioned problem and which is able to generate a desired color over the whole extent of the light system.

SUMMARY

This need is met by the features of the independent claims. Further aspects are described in the dependent claims.

According to a first aspect, a light system is provided comprising a plurality of light modules arranged in at least a row in a system housing having an outer boundary and a diffuser to which the light from the plurality of light source modules is emitted. Each light source module comprises at least one light source emitting light of a predefined color, and the light emitted by each light source module is defined by the light emitted by the at least one light source of the corresponding light source module. The plurality of light source modules comprises at least one first light source module which is located closer to the outer boundary of the system housing than second light source modules of the plurality of light source modules which are located further away from the outer boundary than the at least one first light source module. The light system furthermore comprises a color control unit configured in such a way that, when a desired color is to be generated at the diffuser, it selects a first light source control signal for the at least one light source of the at least one first light source module that is different from a second light source control signal selected for the at least one light source of the second light source modules.

With this light system, it is possible to generate a desired color over the whole light system. It has been found that the at least one first light source module, which is located close to the boundary, has to be controlled in a different way compared to the second light source modules which are located more in the middle of the light system. Normally, the first light source module and the second light source modules in the light system are of the same type and have the same light sources so that at a first glance one might think that the first light source modules and the second light source modules should be controlled in the same way in order to emit the same color. However, as will be explained in more detail further below, due to the geometry of the light system and due to different mixing effects of the light for the first and second light source modules, the first light source control signal for the first light source module should be selected different from the second light control signal which is used for controlling the at least one light source of the second light source modules.

Preferably the plurality of the light source modules are arranged relative to one another such that the light from neighboring light source modules at least partially overlaps at a light mixing area located between the light source modules and the diffuser. The light emitted by one of the second light source modules overlaps in the light mixing area with light of at least N other light source modules, whereas light emitted by the at least one first light source module overlaps in the light mixing area with light from M other light source modules, with M being smaller than N. The color control unit is then configured to control the at least one light source of at least one of the first and second light source modules in such a way that at least one of the light sources of the first light source module and of the second light source modules compensates for a color difference generated by the fact that M is smaller than N. M and N may be integer values and are different as the light from the first light source module located at the border of the light system overlaps with light of a smaller number of the light source modules compared to the second light source modules. As the first light source module may have a smaller number of direct neighboring light source module than the second light source modules, different mixing effects of the light at the diffuser occur. The color control unit may be able to compensate for these different mixing effects so that overall a homogeneous desired color may be obtained at the diffuser over the complete length of the light system.

The invention furthermore relates to the corresponding method for controlling the light system. The light system is designed as mentioned above with the plurality of light source modules comprising at least one first light source module and second light source modules. The color emitted by the light system is now controlled using the light source control signals for each of the light source modules, wherein for each of the light source module the at least one light source is controlled individually using light source control signals. When a desired color is to be generated at the diffuser, a first light control signal is selected for the at least one light source of the first light source module which is different from the second light source control signal that is selected for the at least one light source of the second light source modules.

Features mentioned above and features yet to be explained below may not only be used in isolation or in combination as explicitly indicated, but also in other combinations. Features and embodiments of the present application may be combined unless explicitly mentioned otherwise.

BRIEF DESCRIPTION OF THE DRAWINGS

Various features of embodiments will become more apparent when read in conjunction with the accompanying drawings. In these drawings:

FIG. 4 is a schematic cross sectional side view of the light source modules shown in FIGS. 2 and 3 in a further arrangement of the light source module and the corresponding light distribution.

FIG. 5 is a schematic view similar to the view shown in FIG. 4 with another geometrical arrangement of the light source modules.

DETAILED DESCRIPTION

Figure 1:
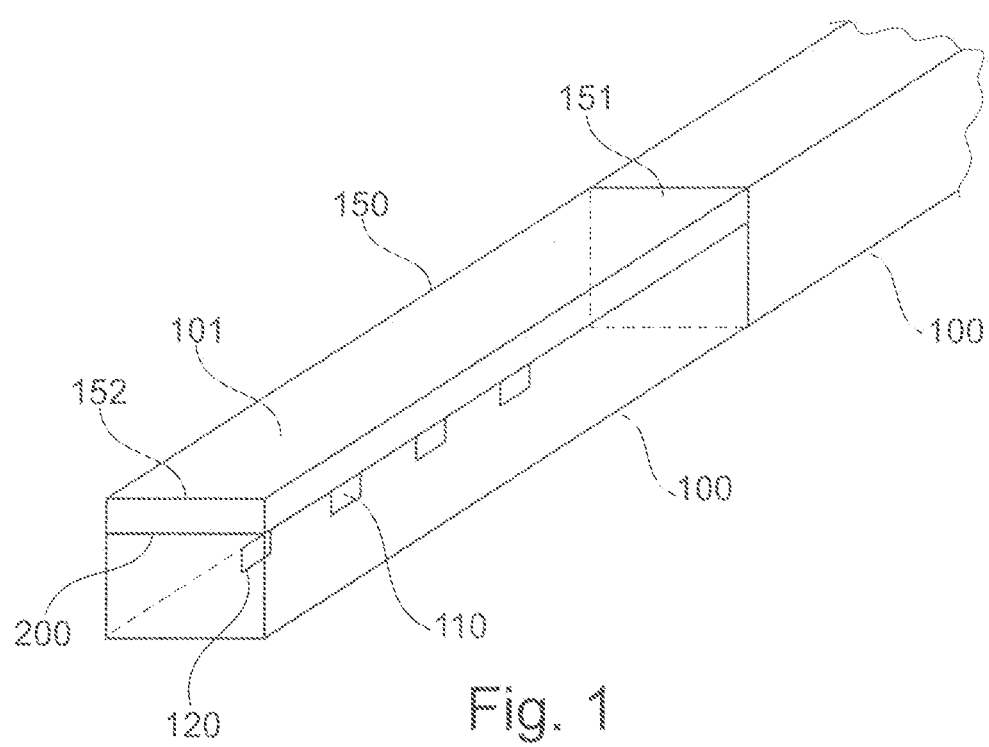
FIG. 1 is a schematic perspective view of a light system in the shape of a light bar arranged side by side with another light bar which can output a desired color over the whole length of the bar.

In the following, embodiments of the application will be described in detail with reference to the accompanying drawings. It is to be understood that the following description of embodiments is not to be taken in a limiting sense. The scope of the invention is not intended to be limited by the embodiments described hereinafter, or by the drawings which are to be taken demonstratively only.

The drawings are to be regarded as being schematic representations, and elements illustrated in the drawings are not necessarily shown to scale. Other various elements are represented such that their function and general purpose becomes apparent to a person skilled in the art. Any connection or coupling between functional blocks, devices, components or other physical or functional units shown in the drawings or described herein can also be implemented by an indirect connection or coupling. A connection or coupling between components or functional elements may be established over a wired or wireless connection. Functional blocks may be implemented in hardware, firmware, software or a combination thereof.

FIG. 1 shows a schematic view of light system 100 in the form of a light bar, wherein in the embodiment shown two light systems 100 are arranged side by side as it may be the case in installations used inter alia in the entertainment industry as part of a concert, performance or stage production. The light system comprises a plurality of light source modules such as light source modules 110 and 120. The light emitted by these light source modules 110, 120 exits the light system at a light exit opening 101, wherein the light passes a diffuser 200 located between the light source modules 110, 120 and the light exit opening 101. The diffuser 200 may also form the light mixing area and/or the light exit opening. The diffuser may also be embodied as a plane diffusing screen arranged in the light exit opening or a protruding diffusing body arranged in/above the light exit opening. The light system 100 is located in an outer housing 150, the housing having a first outer boundary 151 and a second outer boundary 152 in the direction of the axis defined by the arrangement of the light source modules.

Figure 2:
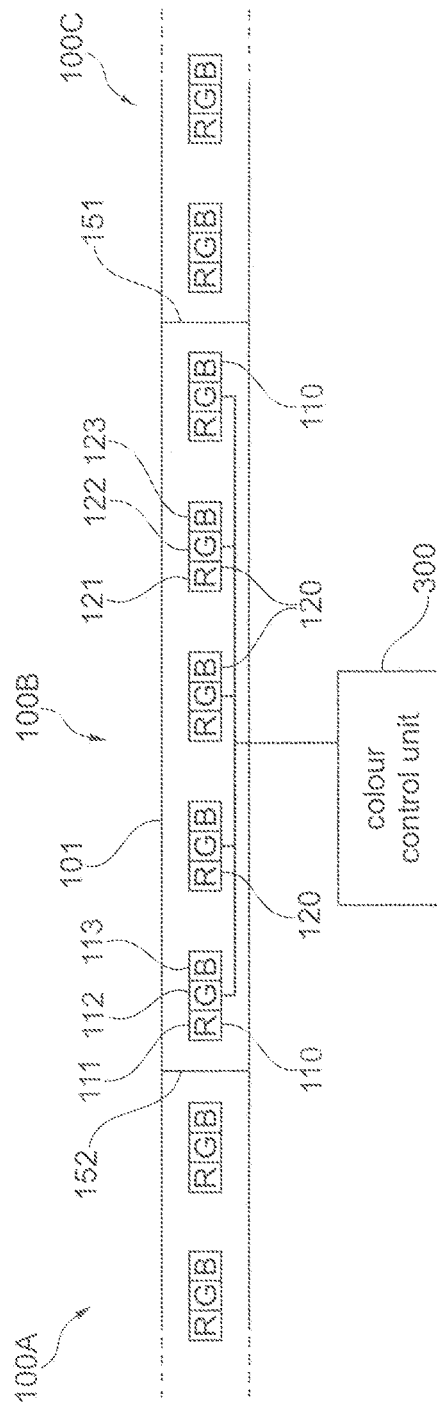
FIG. 2 is a schematic front view of three light systems as shown in FIG. 1 arranged side by side.

FIG. 2 is a schematic, more detailed sectional view. In the embodiment of FIG. 2, three light systems are arranged side by side, such as light systems 100A, 100B and 100C. Each light system comprises first light source modules 110, which are located next to the outer boundary 151 or 152. Furthermore, second light source modules 120 are provided. The first light source modules and the second light source modules differ from one another by the fact that the first light source modules comprise a smaller number of direct neighbors compared to the second light source modules 120. In the example shown in the embodiment of a light bar, light source module 110 has one single direct neighbor, here one light source module 120, whereas a light source module 120 has a neighboring light source module on both sides. Thus, in the embodiment shown, a first light source module has one direct neighboring light source module, whereas a second light source module has two direct neighboring light source modules. However, the present application is not restricted to the light bar with the linear arrangement of the light source modules in a row. The light source modules may also be arranged in a matrix structure, e.g. for a video wall. In this case, the first light source module located at the edge of the matrix may have three direct neighboring light source modules, whereas the second light source module located in the middle of the matrix has four direct neighboring light source modules if only the direct neighbors in the horizontal and vertical direction are considered.

Each light source module 110, 120 in the embodiment shown, comprises three light sources, a red, a green and a blue light source, each of the light sources being an LED. However, it should be understood that other light sources than LED, e.g. organic light emitting diodes, OLEDs, fluorescent lights, polymer light emitting diodes or a combination thereof may be used. Each light source module comprising the different light sources is connected to a color control unit 300. The color control unit 300 is configured to individually control each of the light sources of the light source modules 110, 120. Thus, the color control unit 300 can individually control the red light source 111, the green light source 112 or the blue light source 113 of the first light source module 110 and the red light source 121, the green light source 122 and the blue light source 123 of the second light source 120.

The color control unit may be part of a control entity configured to control other multimedia devices or may be a stand-alone unit. The color control unit generates light source control signals for each of the light sources of the different light source modules in order to generate a desired light effect. Different light effects can be generated by varying the light source control signals in such a way that a desired light effect is achieved at a light exit 101 of the light system 100. In the embodiment of FIG. 2, the diffuser 200 shown in FIG. 1 is omitted for the sake of clarity, however, it should be understood that the diffuser 200 may also be provided in the embodiment of FIG. 2 between the light source modules 110, 120 and the light exit opening 101, which extends over the complete upper surface of the system 100.

Figure 3:
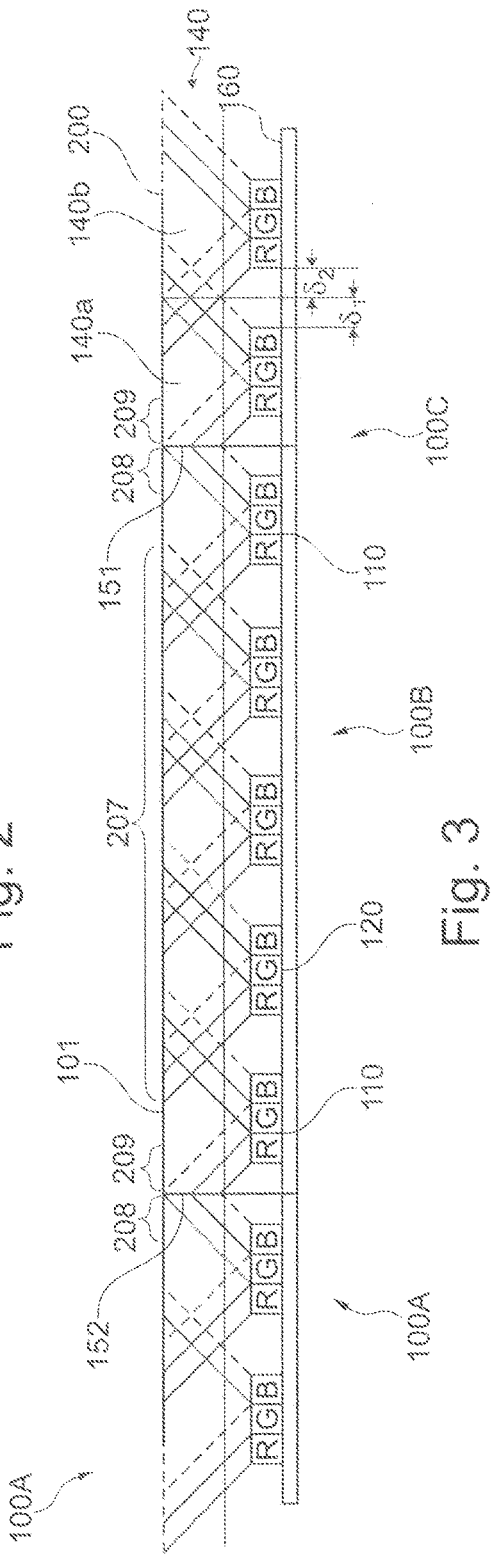
FIG. 3 is a more detailed cross sectional side view of the system of FIG. 2 indicating a first possible distribution of the light source modules used in the system.

FIG. 3 shows a more detailed view of the system of FIG. 2. The different light source modules 110, 120 are arranged on a circuit board 160, which also provides the connection lines to the color control unit 300 (not shown). The LEDs are arranged in regular linear pattern and each light source has a light distribution which symbolizes the light path from the light source module 110 or 120 to diffuser 200. The light emitted by the different light source modules will hit the diffuser 200 and will be diffused by the diffuser before reaching light exit opening 101. In the embodiment shown in FIG. 3, the different light distributions generated by each of the light sources red, green, blue are schematically shown as parallel light distributions. However, as will be explained in more detail in connection with FIGS. 4-6 later on, this is not always the case.

FIG. 3 is provided to explain how the light from first group of LED pixels light source modules 110 and how the light from the second light source modules 120 mix. In the embodiment shown, the light system comprises three second light source modules 120 and two outer first light source modules 110. However, it should be understood that the number of second light source modules can be much larger and depends on the length of the light system.

As can be deduced from FIG. 3, the light from different light source modules 110 or 120 mixes at a light mixing area 140. The light mixing area 140 is the area between the different light source modules and the diffuser at which the light from at least two different light source modules mix. It is noticed that the diffuser also can form the light mixing area. Furthermore, it should be understood that the light mixing area can continue above the diffuser. The width of the light mixing area seen from the different light source modules in direction of the diffuser depends on the light distribution, on the distance between two light source modules and the distance between the light source modules and the diffuser 200. As can be furthermore deduced from FIG. 3, the light mixing area 140 may be divided into different sections, such as the sections 140a and 140b shown on the right side of FIG. 3. Each light mixing area section is defined by the part of the light mixing area located, in direction of the light emission, above a corresponding light source module and is delimited either by an outer boundary 151 or 152 or by a neighboring section of a light mixing area. A border of one section of the light mixing area may be defined to a neighboring section of a light mixing area such that, as shown in FIG. 3, the distance from a border to the corresponding light source modules is the same, in the embodiment shown $\delta 1 = \delta 2$.

For the explanation of the present application it is assumed that there are three second light source modules 120. As can be deduced from the schematic light distributions, the diffuser surface comprises a middle section 207 where the light passes the diffuser which is mixed with the light of at least one other light source. In this middle section 207, the light from the different light source illuminates the diffuser substantially equally and different colors can be created by varying the intensity of the light sources 121-123 in relation to each other. This illumination of diffuser 200 differs, however, for the part of the diffuser located next to the outer boundary 151 and 152 of the housing. Here, the light of each of the light sources 111-113 in section 209 does not mix with another light source module located on the left side due to boundary 152. The same way, in section 208 no light from the other light system 100C located on the right side will mix with the light at the diffuser above the right first light source module 110 of light system 100B. Thus, in these end sections 208 and 209 a different light mixing situation occurs compared to the middle section 207. The light mixing in a section of a light mixing area located above a first light source module differs from the light mixing in a light mixing area located above a second light source module.

Figure 6:
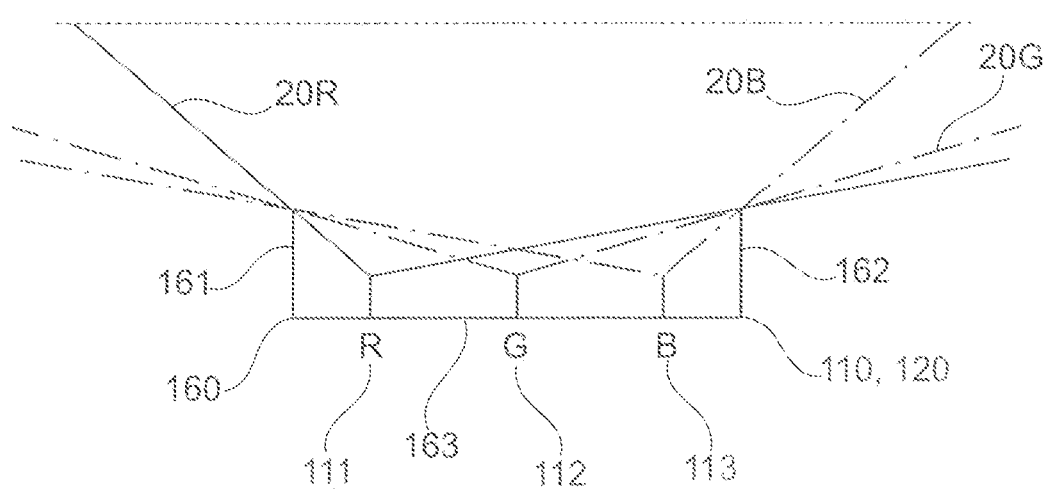
FIG. 6 is an enlarged view showing the different light distributions of the light sources of a light source module.

FIG. 6 shows a more detailed view of a light source module such as a light source module 110 or 120. Thus, the following explanation given in connection with FIG. 6 is valid for the first light source module 110 and for the second light source modules 120. The three light sources, the green, the blue and the red light source, are arranged in a support structure 160, the support structure comprising outer walls 161 and 162. The light sources such as the light sources 111, 112 and 113 (for the first light source module) are located on a base surface 163 of the support structure 160. The light distribution emitted by the red light source 111 outside the support structure 160 is mainly limited by the outer walls 161 and 162 so that a distribution 20R is obtained. The distribution 20R is obtained by the maximum angle at which the light from the red light source 111 can be emitted from the support structure 160 in view of the outer walls 161 and 162. The same is true for the green light distribution 20G and for the blue light distribution 20B. It can be deduced from FIG. 6 that red light reaches further to the right side than the green and blue light, and the blue light can reach further to the left compared to the green and blue light.

It should be understood that the application is not restricted to the support structure shown in FIG. 6. In another embodiment, each light source of a light source module may also be directly connected to a printed circuit board and the light source distribution of the light sources of a single light source module can differ from one another without the influence of the outer walls as shown in FIG. 6.

FIG. 4 now shows the illumination of a diffuser surface 200 for a first embodiment, wherein the light source modules are separated by a distance d1. If it is assumed that to the left of FIG. 4 the light system 100A continues with several other second light source modules 110, it can be deduced that middle section 207 differs from section 208 by the fact that the light of the first light source module 120 is not mixed or only partially mixed with light from the neighboring light source module 120 of light system 100B as the system housing, here the outer boundary 151, is blocking the light emitted from light source module 120 of the system 100B to mix with the light of light source module 120 of light system 100A. As a consequence, the color and/or brightness in section 208, i.e. in the section of the housing next to the outer boundary, will differ from the color at the rest of the housing.

In connection with FIG. 5 another embodiment is disclosed in which the light source modules are installed with a smaller distance d2 relative to each other so that a higher overlap of the light distributions of the different light source modules occurs. The light mixing area 140 in FIG. 5 is larger than the light mixing area 140 shown in FIG. 4. In the example of FIG. 5, it is assumed that as shown in FIG. 6 the different light sources are arranged in each light source module from left to right as a red light source, a green light source and a blue light source. FIG. 5 also shows the corresponding light distributions 20B, 20G and 20R. As can be deduced from FIG. 5, the light source of the second light source module located at the greatest distance from the boundary 151 is the red light source. In section 204 located at the boundary above the first light source 120, the red color from light distribution 20R, is present. However, the outer boundary 151 blocks the light distribution of the neighboring light source module 120 of light system 100B. Thus, the part of the diffuser and as a consequence also the part of the light exit opening arranged above the first light source module, the part of section 204 will have a reddish hue as red is a dominant color in this part and as this dominant color cannot or can only partially be compensated by colors from a neighboring light source module. In the same way, at light system 100B a section 205 above the diffuser exists which has a dominant color of blue, as the blue light distribution at section 205 is not or only partially compensated by colors of a neighboring light source module located on the left side of light source module 120 of light system 100B. As a consequence, in the embodiments discussed in FIG. 4 or 5, the end of the light system located on the right side will have a red hue, whereas the left end of the light system will appear bluish compared to the middle section such as middle section 207 or the middle section where the light from one light source module mixes with light from two other light source modules as it is normally the case for each second light source module 110. Thus, in portion 204 the blue component from a neighboring light source module is missing, whereas in section 205 the red component of a neighboring light source module is missing.

In the present application, this kind of color difference can now be solved in the following way. Color control unit 300 shown inter alia in FIG. 2 can now control the intensity of the different light sources, especially of the first light source modules 120 located at the end of the light system in such a way that the intensities are adapted or compensate for the missing color. The light source control signals can include intensity values for each of the LEDs in order to generate a certain output color obtained by mixing the different colors in dependence on the given intensities. In the example shown in FIG. 5, this may mean that for the light system 100A, a dominant red color in section 204 has to be compensated for. Thus, the light sources of light source module 120 of light system 100A may be adapted by decreasing the intensity of the red emitter relative to the green and blue emitters in order to compensate for the missing blue part. Alternatively, the intensity of the blue and green light sources can be increased in order to compensate for the missing blue part or in order to compensated for the dominant red part.

In the same way, for section 205 which appears blue, the blue component at light source module 120 at light system 100B can be decreased or the red and the green light sources at light source module 120 of light system 100B may be increased. This can be done in a calibrating procedure in which the intensities of the first light source modules are adapted until a homogeneous appearance of the light at the light exit opening is present. The increase in intensity or the decrease in intensity of the different light sources as discussed above may be stored in the color control unit in a storage unit and may be used whenever a uniform color is to be emitted by the light system. The compensation can be used whenever a diffuser with an outer boundary 151, 152 is used with the system, not just for uniform colors but, for all colors and patterns (video input). As the diffuser is optional and can vary in design, there will be different compensations stored in the unit, which can be chosen depending on which type of diffuser is used.

In the embodiments described above, a single first light source module 120 was provided at the border of the housing. However, the geometrical arrangement of the housing may be such that, at each end section of the housing 2 or 3, first light source modules are provided, wherein the mixing situation at these two or three light source modules, i.e. in the corresponding light mixing area above the first light source module is different to the situation of the second light source modules located more in the middle of the housing. Furthermore in the description above, only the light source control signal for the first light source modules was adapted. However, it should be understood that also the light source control signals for the second light source modules may be adapted in order to compensate for the missing light of neighboring light source modules.

How the intensity of the different light sources such as the red, green and blue emitters have to be modified relative to each other depends on various factors, such as the light distribution of the light source modules, the physical shape of the support structure, the distance to diffuser 200 etc. Thus, for each kind of light system the calibration parameters may be found experimentally or are measured by adapting the intensities until a uniform or a desired color is obtained at the light exit opening or in the corresponding light mixing area above a light source module of the system housing.

In the example given above, the difference in color was compensated for by varying the light intensities at the first light source modules. However, it should be understood that the intensity of the second light source module located next to the first light source module may be adapted in order to compensate for the generated dominant color.

From the above-said, general conclusions can be drawn. The plurality of light source modules can be arranged relative to one another such that the light from neighboring light source modules at least partially overlaps at the light mixing area. In this context, the light emitted by one of the second light source modules overlaps in the light mixing area with light of at least N other light source modules where light emitted by a first light source module overlaps in the light mixing area with light from M other light source modules, with M being smaller than N. M and N may be integers. The color control unit 300 can now control the light sources of the first or second light source modules or of both the first and second light source modules in such a way that at least one of the light sources of the first and second light source modules compensates for the color difference generated by the fact that M is smaller than N.

The first light source module comprises the light source module which is located nearest to the outer boundary of the housing. However, it can also include more than only the outermost light source modules, e.g. the two or three outermost light source modules.

Furthermore, each of the plurality of light source modules can comprise at least two light sources emitting light of different colors. When a light source module comprises a single light source, not the color is amended in the sections near the outer border but the brightness, as the single light source of a first light source module overlaps a smaller number of light sources of the same kind of other light source modules.

Furthermore, the different light sources of a light source module can have different light distributions, so that the light distribution emitted by one of the light sources of a light source module differs from the light distribution of another light source of the same light source module.

Furthermore, it is possible that LEDs of different colors are used as light sources. Furthermore, when the light sources of the plurality of light source modules are arranged linearly in direction of the row, one of the second light source modules located next to the first light source module comprises, in direction of the outer boundary, a dominating light source which is located further away from the outer boundary than the other light sources of the second light source module and which emits a dominant color to a section of the light mixing area located above the at least one light source module. In the embodiment of FIG. 5, for the left system 100A, this is the red light source, whereas in the right light system 100B, it is the blue light source. The color control unit can then control at least on of the light sources of the first light source module and the second light source modules in such a way that the influence of the dominant color at the diffuser is cancelled out. As explained above, at the right end of the left light system 100A shown in FIG. 4, the dominant red may be compensated by increasing the intensity of blue and green at light source module 120 located in the system 100A at the right border.

More generally, this means that the color control unit adapts the first light control signals in order to compensate for the color difference generated by the fact that M is smaller than N or the fact that the light of the first light source module mixes with less light of other light source modules, as it is the case for the second fixture.

The first light source module which is used for compensating the dominant color can also comprise the dominant color source and the color control unit of the first light source module can control the light sources of the first light source module in such a way that it decreases a light intensity of the dominant light source at the first light source module relative to the light intensities of the at least one other light source at the first light source module. As an alternative, the color control unit can control the light sources of the first light source module in such a way that it increases the light intensities of the at least one other light source for the first light source module relative to the intensity of the dominant light source.

Furthermore, the light sources of each light source module are arranged on a support structure and the light distribution of the light emitted from this support structure by the light sources is different for the light sources and depends on the position of the light source within the support structure.

In a calibrating mode, the color control unit can adapt the light control signals for the first light source module in such a way that, after the calibration is terminated, a color emitted over the whole extension of the light exit opening is substantially uniform. The color control unit is then configured to store the calibration values for the light sources of the first light source module when the adaptation is terminated.

A diffuser may be located between the plurality of light source modules at the light exit opening.

In addition to the linear arrangement of the light source modules as discussed above, a matrix arrangement with the light source module being arranged in rows and columns can be provided as it is the case in video panels.

Summarizing, with the above-described application a uniform color can be obtained even at the boldest sections of a light system.

The invention claimed is:

1. A light system comprising:
   a plurality of light source modules arranged in at least a row in a system housing having an outer boundary and a diffuser to which the light from the plurality of light source modules is emitted, wherein each light source module comprises at least two light sources emitting light of different colors, wherein the plurality of light source modules comprises at least one first light source module that is located closer to the outer boundary of the system housing than second light source modules of the plurality of light source modules that are located farther away from the outer boundary than the at least one first light source module, and
   a color control unit configured to control, for each of the light source modules included in the plurality of light source modules, the light sources individually using a light source control signal,
   wherein the color control unit is configured such that, when a desired uniform color is to be generated at the diffuser based on the at least one first light source module and based on at least one of the second light source modules, the color control unit selects a first light source control signal for the light sources of the at least one first light source module that is different from a second light source control signal selected for the light sources of the at least one second light source module,
   wherein the plurality of light source modules are arranged relative one another such that the light from neighboring light source modules at least partially overlaps at a light mixing area present between the light source modules and the diffuser, wherein the light emitted by one of the second light source modules overlaps in the light mixing area with light of at least N other light source modules, whereas light emitted by the at least one first light source module overlaps in the light mixing area with light from M other light source modules, with M being smaller than N, wherein the color control unit is configured to control the light sources of the at least one first light source module and of the at least one second light source module in such a way that at least one of the light sources of the at least one first light source module and of the at least one second light source module compensates for a color difference generated based on M being smaller than N, and
   wherein the light sources of the plurality of light source modules are arranged linearly in direction of the row, wherein one of the second light source modules located proximate to the at least one first light source module comprises, in the direction of the outer boundary, a dominating light source that is located farther away from the outer boundary than at least one other light source of the one of the second light source modules, wherein the dominating light source emits a dominant color to a section of the light mixing area located above the at least one first light source module, wherein the color control unit is configured to compensate for the dominant color by controlling at least one of the light sources of the at least one first light source module and of the second light source modules to cancel out the influence of the dominant color in the section of the light mixing area located above the at least one first light source module.

2. The light system according to claim 1, wherein the at least one first light source module includes a light source module, included in the plurality of light source modules, that is located nearest to the outer boundary in direction of the row.

3. The light system according to claim 1, wherein the at least one first light source module also comprises the dominant light source, wherein the color control unit is configured to control the light sources of the at least one first light source module such that the control unit decreases the light intensity of the dominant light source at the at least one first light source module relative to the light intensity of the at least one of the light sources of the at least one first light source module.

4. The light system according to claim 1, wherein the at least one first light source module also comprises the dominant light source, wherein the color control unit controls the light sources of the at least one first light source module such that the control unit increases the light intensity of the at least one of the other light sources of the at least one first light source module relative to the light intensity of the dominant light source.

5. The light system according to claim 1, wherein the color control unit is configured to operate in a calibrating mode in which the light control signal for the at least one first light source module is adapted until a color emitted by a section of the diffuser that is illuminated by the at least one first light source module corresponds to the desired color, wherein the color control unit is configured to store a calibration value for at least one light source of the at least one first light source module when the adaptation is terminated.

6. The light system according to claim 1, wherein the at least one first light source module and the at least one second light source module include the same light sources, wherein the color control unit is configured to generate the first light source control signal that contains first intensity values for the light sources of the at least one first light source module that are different from second intensity values for the light sources of the at least one second light source module when the color emitted at the diffuser corresponds to the desired color.

7. The light system according to claim 1, wherein the plurality of light source modules are arranged in a matrix shape in rows and columns in the system housing, and wherein the at least one first light source module comprises at least the light source module in the matrix that is located closest to the system housing.

8. A light system comprising:
a plurality of light source modules arranged in at least a row in a system housing having an outer boundary; and
a diffuser to which the light from the plurality of light source modules is emitted,
wherein each light source module included in the plurality of light source modules comprises at least two light sources emitting light of different colors, wherein the plurality of light source modules comprises at least one first light source module that is located closer to the outer boundary of the system housing than second light source modules included in the plurality of light source modules that are located farther away from the outer boundary than the at least one first light source module,
wherein the color emitted by the light system is controlled via a light source control signal for each of the light source modules, wherein, for each of the light source modules included in the plurality of light source modules, the light sources are controlled individually using the light source control signal, wherein, when a desired uniform color is to be generated at the diffuser based on the at least one first light source module and based on at least one of the second light source module, the first light source control signal is selected for the light sources of the at least one first light source module that is different from the second light source control signal selected for the light sources of the at least one second light source module,
wherein the plurality of light source modules are arranged relative one another such that the light from neighboring light source modules at least partially overlaps at a light mixing area present between the light source modules and the diffuser, wherein the light emitted by one of the second light source modules overlaps in the light mixing area with light of at least N other light source modules, whereas light emitted by the at least one first light source module overlaps in the light mixing area with light from M other light source modules, with M being smaller than N, wherein the light source control signal is configured to control the light sources of the at least one first light source module and of the at least one second light source module in such a way that at least one of the light sources of the at least one first light source module and of the at least one second light source module compensates for a color difference generated based on M being smaller than N, and wherein the light sources of the plurality of light source modules are arranged linearly in direction of the row, wherein one of the second light source modules located proximate to the at least one first light source module comprises, in the direction of the outer boundary, a dominant light source that is located farther away from the outer boundary than at least one other light source of the one of the second light source modules, wherein the dominant light source emits a dominant color to a section of a light mixing area present above the at least one first light source module, wherein the dominant color is compensated for by controlling at least one of the light sources of the at least one first light source module and the second light source modules to cancel out the influence of the dominant color in the section of the light mixing area located above the at least one first light source module.

9. The system according to claim 8, wherein the at least one first light source module further comprises the dominant light source, wherein the light sources of the at least one first light source module are controlled such that the light intensity of the dominant light source of the at least one first light source module is decreased relative to the light intensities of the other light sources of the at least one first light source module.

10. The system according to claim 8, wherein the at least one first light source module further comprises the dominant light source, wherein the light sources of the at least one first light source module are controlled such that the light intensity of at least one other light source of the at least one first light source module is increased relative to the light intensity of the dominant light source at the at least one first light source module.

11. The system according to claim 8, further comprising a color control unit that operates in a calibration mode and performs the steps of:
determining at least one calibration parameter by adapting the light control signals for the at least one first light source module until a color emitted by a section of the diffuser that is illuminated by the at least one first light source module corresponds to the desired uniform color,
storing the at least one calibration parameter, and
subsequently using the at least one calibration parameter for the light sources of the at least one first light source module.

* * * * *